Fig. 4.

United States Patent Office 3,045,742
Patented July 24, 1962

3,045,742
APPARATUS FOR MAKING FABRIC FACED BELTS WITH PLASTIC BACKINGS
Charles Brooks, Flushing, Thomas A. Sutton, Floral Park, and Charles Brownold, Valley Stream, N.Y., assignors to Cee Bee Mfg. Co. Inc., Brooklyn, N.Y., a corporation of New York
Filed Apr. 2, 1957, Ser. No. 650,206
1 Claim. (Cl. 156—463)

The present invention relates to a belt making system and it particularly relates to a machine and apparatus for making fabric faced belts.

In the manufacture of fabric faced belts a relatively stiff or reenforcing backing strip is assembled with the fabric facing to reenforce the same and to enable the belt to have sufficient body to be utilized with either women's or men's garments, and also to permit the usage of relatively sheer or lightweight fabrics which will match the fabric which is used in the article of clothing with which the belt is to be used.

Although the present invention will be particularly described in its application to fabric faced belt making and belt making machines, it has a much broader application to the lamination of fabrics of satisfactory light, medium or heavy weights, and reenforcing means so that the fabric and the reenforcing means will substantially have the same external contour and conformation, and at the same time be adhesively connected together so that such adhesive connection may either be a permanent connection or may be enhanced by peripheral stitching.

The present invention has a particular application to machines and methods for making fabric faced belting in which the fabric face of the belt conforms or is in decorative compliance or contrast with a woman's dress, and which belts which will be described in the present application will be of the women's dress variety, with the understanding that the present method and machine has a much broader application.

It is among the particular objects of the present invention to provide a substantially automatic procedure and mechanism for making belt assemblies of the character described in which there are a minimum of hand operations and in which high quality, uniform, fabric faced belts will be produced at a high rate of production without the necessity of skilled operators.

It is among the further objects of the present invention to provide a belt making method and mechanism which will produce belts with a minimum of manual labor and assurance of uniformity of production and high quality without excessive folding and assembling operations.

A still further object of the present invention is to provide a material belt construction with a plastic backing which may be made at relatively high production rates with assurance of substantially permanent connection of the belt facing and the plastic backing, and with a maximum of conformation between the belt and plastic backing and size and shape.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects according to one embodiment of the present invention, a strip of fabric facing and a reenforcing backing strip are first assembled together in such a manner that the backing structure is caused to conform to the final desired shape, size, width and contour of the belt, while the fabric strip is caused to conform to the backing strip.

For example, in connection with a belt which has a certain width and a pointed end, the fabric will initially be fed to the assembled position of the greater width than with the width of the backing, and with a squared end rather than a pointed end, and then the fabric will be folded under so that its final folded edge will conform to the backing edges, all this being carried out automatically as the fabric is being advanced.

This assembled folded fabric, superimposed upon the backing, is then passed into or through an attachment operation which may take various forms, but which in the preferred embodiment of the present invention consists of a heat adhesion operation.

In lieu or in addition to this heat adhesion operation it is also possible to utilize parallel automatic sewing machines which will automatically stitch the edges of the belt to the backing as the assembly has been completed by folding under the edges of the fabric material.

In this folding operation it is found desirable first to fold the side or lateral edges of the fabric under until the folded fabric has the same width of the backing structure. Next, the forward edges of the fabric are folded under to conform to the point or other end structure of the backing.

With a pointed belt desirably first one corner of the edge folded fabric is folded under to conform to the corner of the backing reenforcement, and then the other corner is folded under and then the end corner folds and the side folds are clamped together with the backing and are passed through heated rolls or plates to cause a permanent adhesion.

This assembly operation is accomplished by relative vertical movement between the folder positioned obliquely to the longitudinal axis of the belt to be formed, which first turns down the end corner of the edge folded fabric, following which forward movement of the combination belt and backing causes an under-insertion of this down folded corner between the fabric and the backing.

This corner folding and insertion operation is repeated for the other corner so that the complete folded assembly is then ready to be passed into the mechanism for heat adhesion.

An important feature of the present invention resides in the fact that the heat adhesion will only take place at the interior edges of the folded under sections, and this is accomplished by restricting the adhesive material to the center portion of the backing reenforcement with the edges of the backing reenforcement, and the bottom of the backing reenforcement being preferably assembled with a nonadhesive fabric facing.

In one desired form of the present invention a thermoplastic resin impregnated fabric strip is used as the backing, and this fabric strip is first covered on its entire bottom and top edge portions with a fabric covering. This will leave the balance of the exposed portion of the backing consisting of the middle of the top face which is to be assembled with the inturned under folded edges free for adhesive connection purposes.

After the adhesive connection is made by running the assembly through heated rollers or under pressing irons the adhesive connection is finally formed.

In a preferred form of the invention a series of belts carry the assembled folded fabric and backing between a series of heating irons which cause a completion of the adhesion, following which the belt is discharged into a suitable hopper.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 3 is a side elevational view of the folding assembly taken from the line 2—2 of FIG. 1.

FIG. 5a is a transverse vertical sectional view taken upon the line 5a—5a of FIG. 3.

Figures 2, 14, 15:
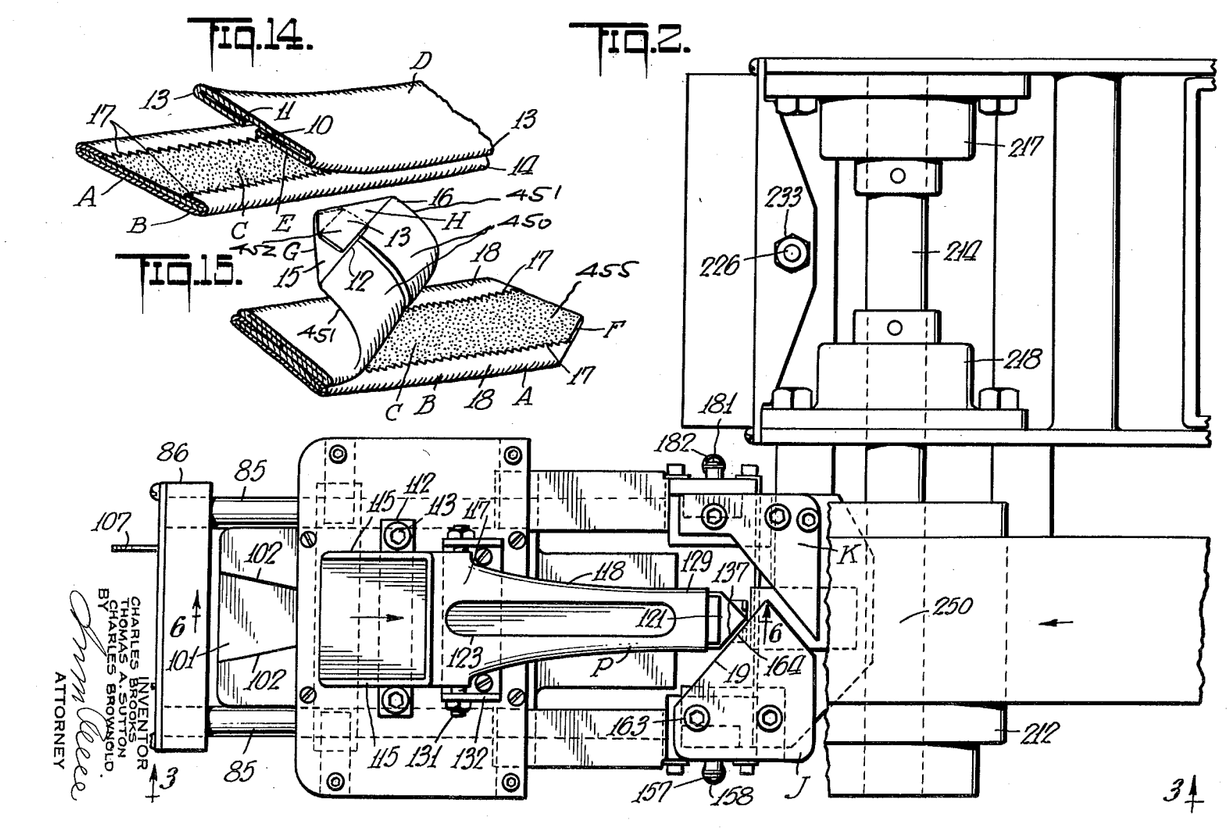
FIG. 2 is a top plan view of the initial folding assembly arrangement of FIG. 1 upon an enlarged scale as compared to FIG. 1.
FIG. 14 is a top perspective view indicating the assembly of the body of the fabric face to the adhesive backing with the side edges under and in-folded so that they will be in position to be adhered to by the adhesive.
FIG. 15 is a top perspective view similar to FIG. 14 illustrating how the body of the belt is adherently connected to the plastic backing and also indicating how the folded corner of the fabric facing is to be assembled with the adhesive connection.

Referring first to the final belt assembly as shown in FIGS. 14 and 15, the plastic backing A is covered with a fabric bottom and side edge face B leaving only the central upper portion C exposed.

The fabric facing D has its side edges folded under as indicated at E, where they will be accessible to and contact the adhesive attachment C.

The backing A as shown in FIG. 15 has an oblique corner construction F.

To conform the fabric facing to the corner F, first one corner G and then the other corner H is folded under for adhesive attachment.

The fabric backing A may consist of a thermoplastic resin impregnated stiff fabric material.

The fabric itself may be a single or multiple number of layers of a heavy woven rayon, cotton, nylon, Dacron, Orlon, Dynel, cellulose acetate, linen or even glass fibre woven fabric.

If desired, the threads or strands of the backing may have sufficient thermoplastic surface to adhere to the inturned and under-turned edges of the fabric base.

The fabric face however should not be made of thermoplastic fibres or filaments. Usually, however, the backing material is impregnated with resinous material such as acrylic resins, polyethylene resins, polyester resins, ethylcellulose resins, nylon resins, styrene resins, or even such resins as urea formaldehyde, melamine formaldehyde, phenol formaldehyde which are thermo-setting and become infusible and insoluble when subjected to heat treatment, although they are initially fusible and soluble.

The plastic or resinous adhesive may either be in the form of a solution or viscous or powdered coating, and the heat within the heating attachment stage may be sufficient to cause the particles of the resin to fuse together on to the edges of the fabric.

Where a solvent is used the heat is sufficient to cause evaporation or removal of the solvent. In any case, however, it is the edges 10 and 11 of the folded under portions E that adhere to the adhesive portion C at the central portion of the side of the backing A.

At the corner F it is the folded in corners 12 and 13 that adhere to the central plastic adhesive C. The edges 13 and 14 of the fabric face D and backing A are devoid of attachment and may be readily separated. The same is true of the outer portions 15 and 16 of the in-folded corners.

These edges and corners 13 and 14 and 15 and 16 may be left unattached in the final belt or they may be stitched together.

It will be noted that the outer edge of the belt consists of superimposed folds at 13 and 14 along the side edges and at 15 and 16 along the corners.

The fabric cover B is desirably of such a nature as to match the color and texture of the fabric face D, and at the same time take up the adhesion so that the bottom and top side edges of the plastic backing A will not be of adhesive nature and will have lost their adhesive qualities.

The serrated edges 17 along the infolded portions 18 assure a firmer connection of the edges of the fabric cover B to the plastic backing A.

Figures 10, 11, 12, 13:
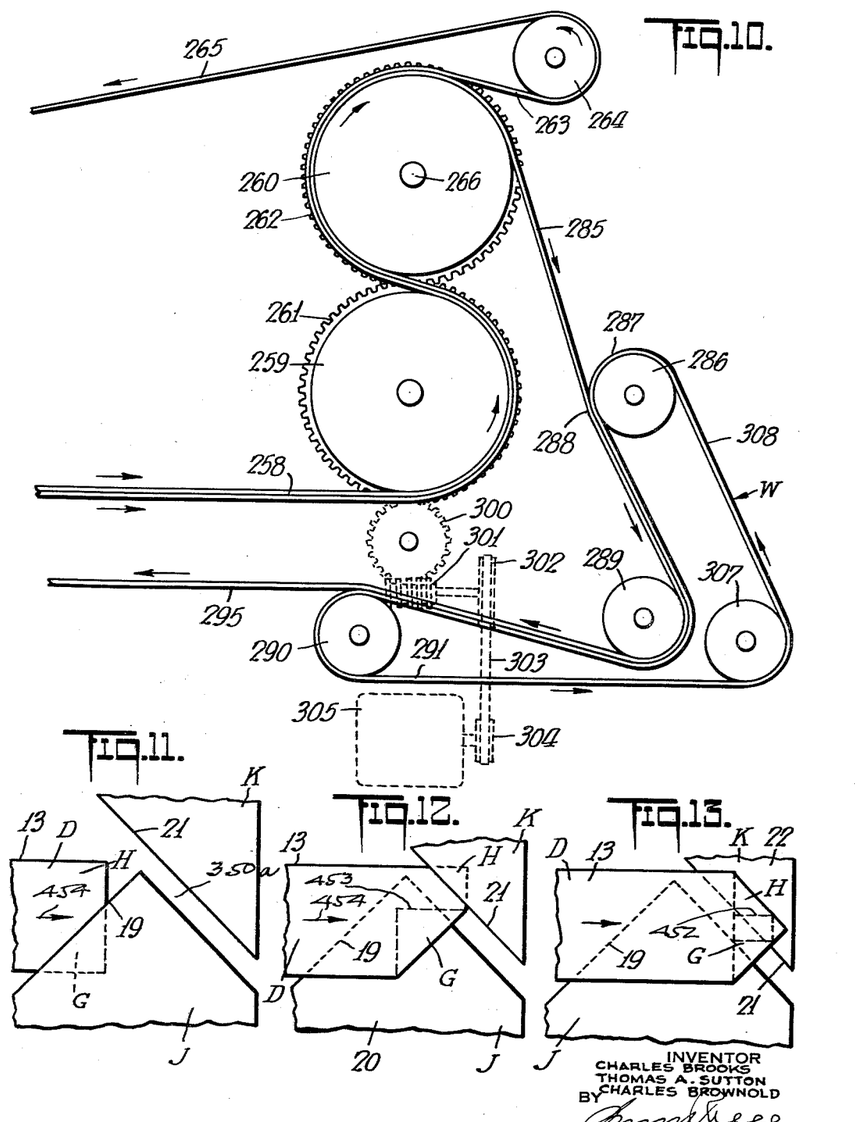
FIG. 10 is a diagrammatic side elevational view of the end roller arrangement to the left of FIG. 1, taken upon the line 10—10 of FIG. 1, but upon an enlarged scale as compared to FIG. 1.
FIGS. 11, 12 and 13 are diagrammatic top plan views illustrating successive operations in the corner down and under folding of the fabric facing, FIG. 11 indicating the initial position, FIG. 12 indicating the down and under folding of one corner and FIG. 13 indicating the down and under folding of the other corner.

The folding operation which is carried out by mechanism is best shown in greater detail in FIGS. 2 to 8 and is diagrammatically shown in FIGS. 11, 12 and 13.

In FIGS. 11, 12 and 13 the fabric face D which has already been longitudinally folded inwardly and under along its edges 13 is advanced to the corner folders J and K.

The fabric face D will be advanced until its corner G is under the conforming edge 19 of the vertically reciprocable folder member J shown in up position in FIG. 11.

At the stage shown in FIG. 11 the corner folder at J will be moved down from above the fabric face D to below the fabric face D and as the belt continues to advance to the right, the corner G will be folded in as it rides over the top surface 20 of the corner folder J.

The inturned corner G will be in contact with this top surface 20 in the position shown in FIG. 12, and at this stage the other corner H will move under the second corner folder K.

In FIG. 12 the corner folder J is below the belt G while the second corner folder K is above the belt G.

Then the second corner folder K, as shown in FIG. 13, will move to below the belt causing the corner H to be folded down and the continued movement of the belt to the right will cause the corner H to be folded inwardly and right over the top face 22 of the corner folder K.

The folding edges 19 and 21 of the folders J and K will have an inclination corresponding to the inclination of the sides of the corner F of the backing A of FIG. 15.

This briefly describes the folding operation which will be more thoroughly covered in connection with the mechanism.

Figure 1:
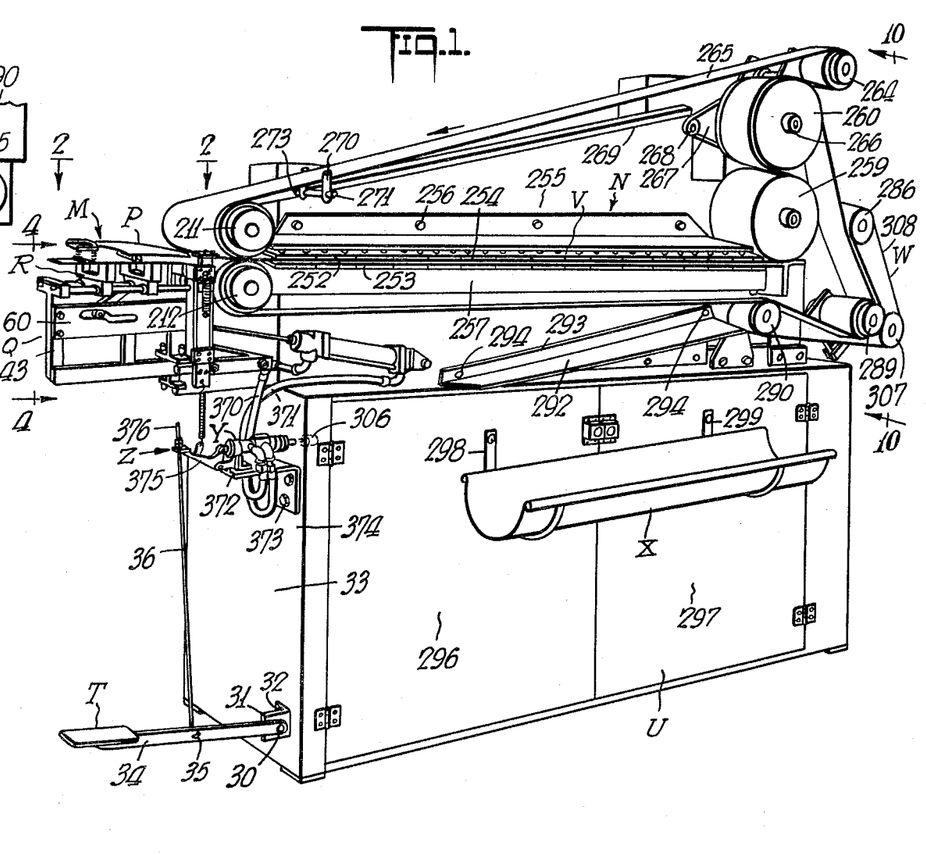
FIG. 1 is a side perspective view of the entire assembling mechanism showing the initial folding at the left and the heat adhesive arrangement to the right.

Now referring to FIG. 1, the mechanism essentially consists of a preliminary folding and assembly arrangement M and a heat adhesive attachment arrangement N.

The folding mechanism M consists of a lateral folder P which is shown in FIGS. 2, 4, 6 and 7. This corner folder is supported on a frame structure Q which carries the driving mechanism for the corner folders J and K.

As shown in FIG. 3, the side edge folder P is provided with a forwardly and rearwardly reciprocating carriage R which is actuated by means of the pneumatic motor S. This pneumatic motor S will cause forward reciprocation of the carriage R carrying the lateral edge folder P.

This movement of the carriage will actuate the corner folders so that they will successively partake of the movement as indicated in FIGS. 11, 12 and 13.

The apparatus may be controlled by means of the manual treadle means T.

The heat adhesive attachment system is mounted upon a supporting box or frame U and it has the pressing irons V through which the assembled belts will pass.

It then has a final discharge roller arrangement W which will deposit the finished, assembled and adhesively connected fabric faced plastic backing into the receptacle X.

The foot treadle T of FIG. 1 is pivotally mounted at 30 upon the angle bracket 31 which in turn is mounted at 32 upon the wall 33 of the supporting box or frame U.

The arm 34 of the foot treadle T has a connection at 35 to the vertical actuating rod or connection 36.

Figure 5:
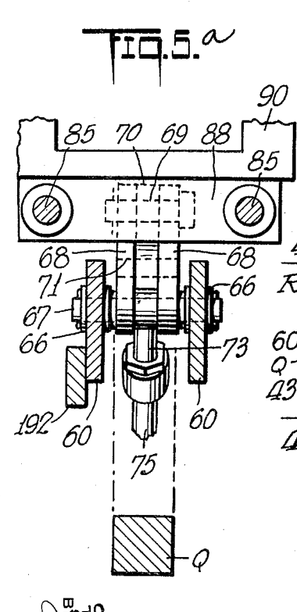
FIG. 5 is a transverse vertical sectional view taken upon the line 5—5 of FIG. 3.

Now, referring to FIG. 5, the rod 36 has a spring connection 37 to the eye 38 which in turn operates the slide member 39. There are two slide members 39 and 40, 39 for operating the corner folder J and 40 for operating the corner folder K.

The slide 39 slides in the guides 41 and 42 on the side of the frame structure Q. The frame structure Q has the end vertical member 43 which is mounted upon the horizontal bottom bar 44.

The vertical member 43 carries the side slotted cam plates 60 which are held in position by means of the bolts 61 and 62 on the vertical member 43.

The opposite slots 63 have an upper slot portion 64 and a lower slot portion 65 and in the slot rides the roller 66 (see FIG. 3). The roller 66 is mounted on the stud 67 which is carried on the parallel arms or lever plates 68. The upper end of the parallel arms or lever plates 68 has a pivotal connection at 69 to the base portion 70 of the carriage R.

Between the lever plate 68 is a pivotal connection 71 to the eye 72 of the actuating rod 73 (see FIG. 3). The actuating rod 73 is connected at 74 to the piston rod 75 of the air pump cylinder S. The air pump cylinder S or pneumatic motor S will cause reciprocation movement of the carriage R.

Figure 4:
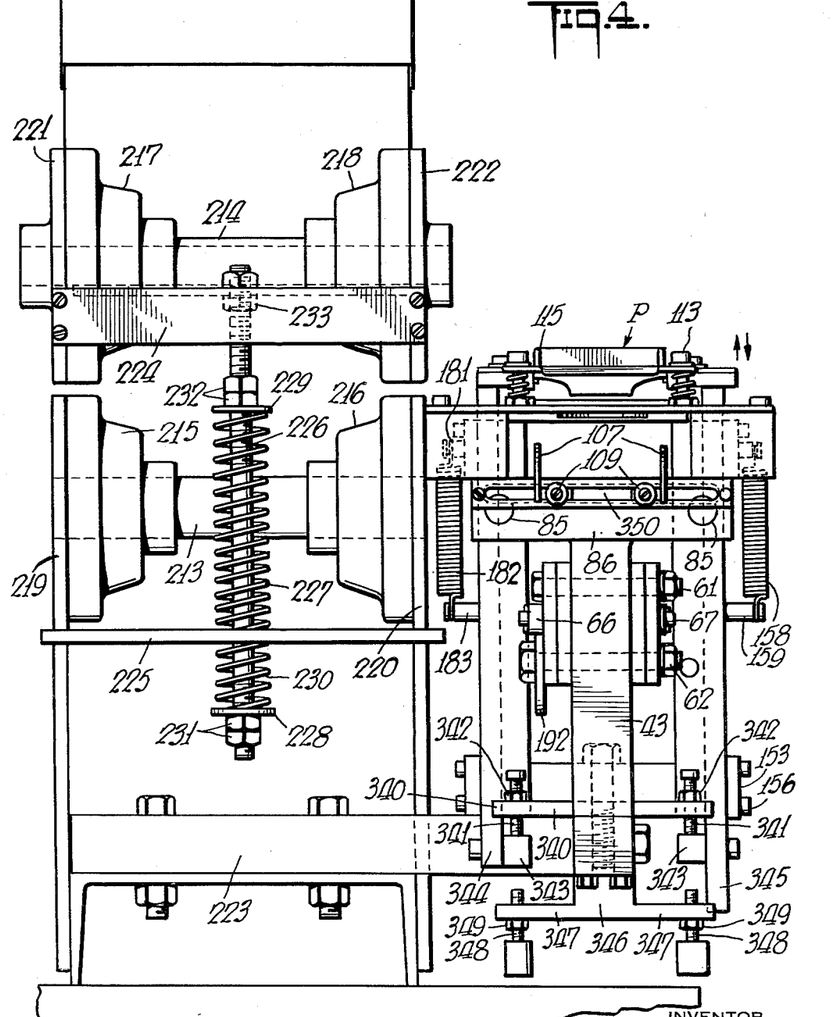
FIG. 4 is an end elevational view taken from the line 4—4 of FIG. 1 upon an enlarged scale as compared to FIG. 1.

The carriage R has the two side aligned guide rails or tracks 85 which at their outer ends are mounted in the cross member 86 (see FIGS. 2 and 4).

The forward end of the guide rails 85 terminate in the vertical members 87. The carriage R has two eye members 88 and 89 at each side which slide upon the rails 85 which are connected together by the structure 70.

Figures 5, 6, 8, 9:
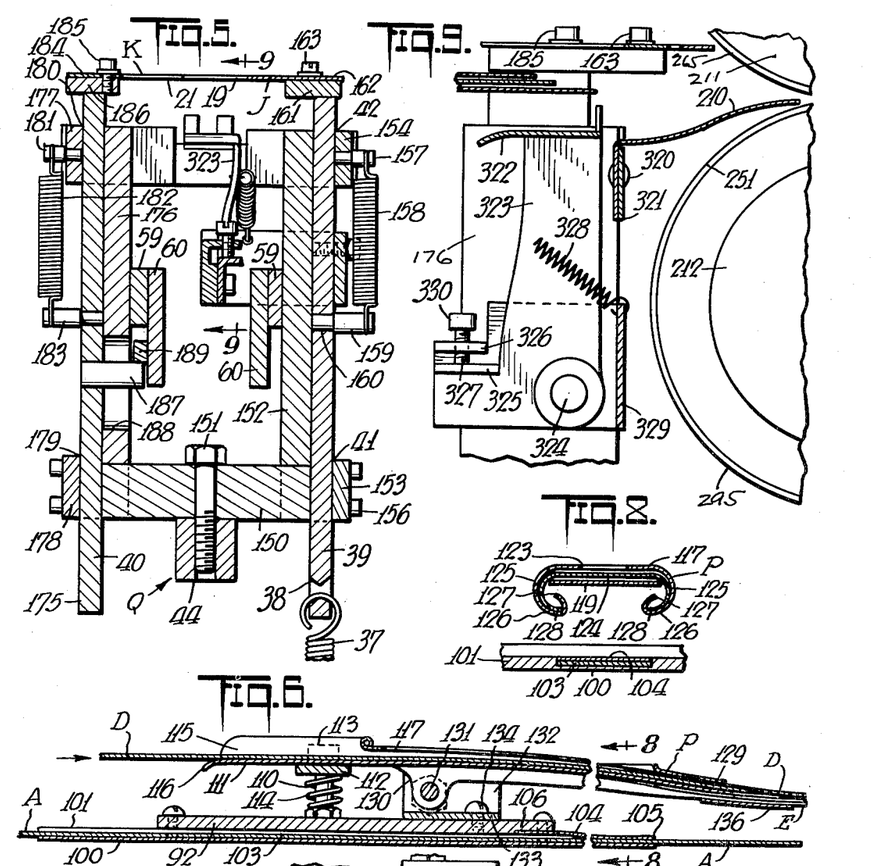
FIG. 6 is a transverse vertical sectional view taken upon the line 6—6 of FIGS. 2.
FIG. 8 is a transverse vertical sectional view taken upon the line 8—8 of FIG. 6.
FIG. 9 is a transverse vertical sectional view taken through the line 9—9 of FIG. 5.
Figure 7:
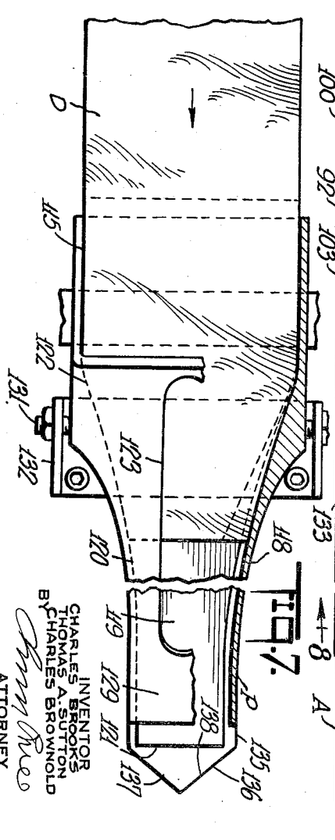
FIG. 7 is a top plan view of the folder arrangement of FIG. 7 partly broken away more clearly to show the interior construction.

The structure 70 has upwardly extending arms 90 and 91 which carry the base plate 92 of the lateral or edge folder mechanism P. The lateral edge folder is best shown in FIGS. 6 and 7.

The base plate 92 of the edge folder P has a lower slide way 100 with the slot 101 in which is inserted the backing A.

The entrance of the slot as best shown in FIG. 2 has the convergent side edges 102 between which the backing A may be inserted.

The backing then will slide under the base plate 92 as indicated at 103, until it comes under the spring finger 104. The spring finger 104 has a serrated forward edge 105 (see FIG. 6) and it is held in position at its rear end in a slot 106 on the underface of the base plate 92.

The plastic backing A may be fed up into the slide way 101 through the corner guide member 107 which is mounted upon the cross member 86 by the plate 108. The plate 108 is held in position by the screws 109.

Mounted upon the base plate 92 by the vertical rods 110 is the base plate 111. The base plate 111 has the outstanding ears 112 which engage these rods 110. The upper ends of the rods 110 are provided with the nuts or studs 113 and the coil springs 114 which encircle the rods 110 press the ears 112 up against the stops 113.

The entrance side of the plate 111 has the side walls 115 to form an entrance funnel through which the fabric facing D in full width may pass as indicated in FIG. 6. The downturned underlip 116 will assist in the feed. The fabric will then pass over the lower plate 111 and under the upper covering plate 117.

The folder, as shown best in FIGS. 2 and 7, converges forwardly at 118 and has a central forwardly converging plate or tongue 119 with the convergent edges 120 and the terminal outlet edge 121.

The fabric ribbon as it enters the throat at 122 in FIG. 7 will pass over the tongue 119 but its side edges will be forced under the tongue or plate 119 until it reaches the width of the terminal portion 121 of the tongue 119 (see FIG. 7).

This will take place under the central slot 123 in the top plate 117 which slot enables access to and adjustment of the passing fabric face or ribbon material as it is being folded.

In FIG. 8 is shown the position of the ribbon toward the end of the lateral folding operation and adjacent the terminal edge 121 of the tongue 119.

As shown in FIG. 8 the tongue 119 will support the central portion 124 of the ribbon under the slot 123. The side edges of the top plate 117 will turn increasingly downwardly as indicated at 125 and then inwardly as indicated at 126, and finally upwardly as indicated at 127 to form guides for the edges 128 of the fabric strip D. These edges will come under the tongue plate 119 and at the exit end 129 of said upper plate 117 the upper fabric or ribbon will be folded to the folded edges as indicated at 13 in FIG. 14.

It will be noted that the sides of the folder mechanism P are provided with the downwardly extending pivot ears 130 which are pivotally mounted by the bolts 131 in the side walls 132 in the U-shaped bracket 133. This U-shaped bracket 133 is mounted on the base plate 92 by the screws 134 (see FIG. 6).

Normally the springs 114 will tend to press the lateral folder P upwardly adjacent the entrance portion between the walls 115 and downwardly toward the exit end 121.

The bottom plate 111 of the folder P at its forward end 135 is cut off to form a corner at 136 which conforms to the corner of the backing material A and also to the corner which is to be formed in the fabric facing material D.

The edges 137 and 138 of this corner will conform to the oblique edges 19 and 21 of the sequential corner folders J and K.

After the lateral folding is accomplished by the structure described in connection with the folder P in FIGS. 6, 7 and 8, the next operation will consist of the corner folding which is diagrammatically illustrated in FIGS. 11, 12 and 13 and in top view in FIG. 2 and in side view in FIG. 3.

In this operation the corner folder J is first moved downwardly by means of the treadle T, the rod 36 and the spring connection 37. This will draw down the reciprocating side plate 39 sliding in the guides 41 and 42 as shown in FIG. 5.

Referring to FIG. 5 there is shown a cross-member 150 which is mounted by the bolt 151 upon the main longitudinal bar 44. The cross piece carries the side frame structure 152 upon which are mounted the outside plates 153 and 154, held in position by the screws or bolts 155 and 156.

The top plate 154 has an outwardly extending stud 157 which is connected by the spring 158 to the stud 159. The stud 159 is mounted by the reduced diameter portion 160 in the sliding member 39.

The spring 150 will normally bias or draw the sliding plate 39 to its uppermost position. The sliding member 39 has a top plate 161 upon which is carried the plate 162 forming the main structure of the corner folder J. The plates 162 and 161 are held in position by means of the bolts 163.

It will be noted in FIG. 2 that there is only a very narrow clearance 164 between the folding edge 19 of the folder J and the adjacent edge 137 of the corner of the lateral folder member P, so that as the plate 162 is moved downwardly it will catch the projecting corner G of the fabric facing as shown in FIG. 11, and fold it vertically downwardly with the result that further forward motion will fold it under to the position indicated in FIG. 15.

This downward reciprocating movement will take place when the treadle T is pressed downwardly and when the fabric is in the position shown in FIG. 11.

The movement downwardly of the treadle T will also actuate the air valve Y through the linkage Z.

The operation of the motor S will draw forward on the carriage and cause a forward movement from the initial position of FIG. 11 to the final position of FIG. 13.

It will be noted that both corner folders J and K merely vertically reciprocate with the under-folding being caused by the continuous forward movement of the lateral folder P carrying the assembled facing fabric D and backing A.

The automatic operation of the second corner folder K results from the movement of the roller 66 in the cam slots 63.

As shown in FIG. 5 the sliding bar 175 will slide against the frame member 176 and inside of the plates 177 and 178 which are held in position on the frame structure Q. This will form the bearing members 179 and 180.

The stud 181 on the top plate 177 will be connected by the spring 182 to the lower stud 183 in the sliding bar 175 and tend to bias it upwardly. On the top of the sliding bar 175 there will be positioned the bar 186 having the plate 184 which is held in position by a screw 185.

The bar 175 has the stud 187 which extends into the vertical slot 188. On one side of the frame structure Q there will be positioned the swinging cam bar 60 which is pivotably mounted at 193 on the vertical frame element 43 of the structure Q. This cam bar has a forwardly extending nose 189 and a camming curved surface 194 (see FIG. 3) which will ride on top of the stud 187.

The nose 189 is held in position on top of the stud 187 as shown in FIG. 5. As the rollers 66 move forwardly from the solid line position of FIG. 3 to the dotted line position of FIG. 3, they will press down on the upper edge 195 of the cam bar 60 which in turn will press down on the stud 187, lowering the plate 175, and the corner folder K to fold the corner H of the fabric facing D.

When this occurs the carriage R is still being moved forwardly by the motor S through the rods 73 and 75 in the connection 74.

The folded forward corner of the fabric facing D and the correspondingly shaped backing A will be moved forward together and guided by the upper oblique guide plate 210 to between the upper and lower guide rollers 211 and 212 (see FIG. 3).

These guide rollers are carried on the shafts 213 and 214 (see FIG. 4) which in turn are mounted upon the trunnion bearings 215 and 216 having the lower shaft 213, and 217 and 218 for the upper shaft 214.

The trunnion bearings 215 and 216 are respectively supported by the plates 219 and 220 and 221 and 222.

The lower support structure is also provided with the cross members 225. The cross members 224 and 225 are connected by the rod 226 and the springs 227 and 230 which have the washer plates 228 and 229.

The springs 227 and 230 are held in adjusted position by means of the nuts 231 and 232 and the entire rod is mounted by the nuts 233 on the upper transverse structure member 224.

The springs 227 and 230 will press the rollers 211 and 212 together to grip the forward end of the assembled folded fabric facing D and plastic backing A, so that the backing and facing will be held in correct position in respect to one another.

During the heat sealing operation it will be noted that the upper belt 250 and the lower belt 251 will engage the assembled folded fabric facing D and the plastic backing A and will carry them between the successive heating irons 252 and 253, which contain electrical resistance heater elements.

Each upper iron or presser member 252 is supported from an upper rail or carrier 254 which is bolted to the side 255 of a support structure by the bolts 256.

Only the lower platens need to be heated since the heat will radiate upwardly.

The lower heater irons 253 will be supported on the horizontal member 257 which also extends the full length of the rear structure of the machine. The upper belt 250 and the lower belt 251 will then carry the assembly past fifteen pairs of contacting irons 252—253 to the position 258.

Both belts will then be carried over the rear roller 259 which may be heated, and then over the upper roller 260 which may be geared together by the gearing 261 and 262.

The upper and lower belts will first be separated at the position 263 at which position the upper belt may be carried over the upper roller 264, and it will then pass downwardly and forwardly at 265 (see FIGS. 1 and 10).

It will be noted that the shaft 266 of the upper roller 260 is pivotally mounted upon the arm 267. The arm 267 is pivotally mounted on the structure 269.

The upper belt in passing forwardly will pass between the upward extending elements 270 of the guide fork 271 which is supported upon the frame structure 273.

Referring to FIG. 10 at the point of separation 263 the lower belt will pass downwardly as indicated at 285 carrying the assembled fabric facing and backing, and it will then pass under the lower guide roller 286 which also carries the belt 287.

The belt 287 will then engage the lower belt 285 at the position 288 and also both belts carrying the assembly will pass over the roller 289 and then forwardly to the roller 290, where the auxiliary carrier belt will pass rearwardly as indicated at 291 while the lower belt will pass forwardly as indicated at 295.

At this point the assembled fabric face D and belt backing A will be discharged on to the tray 292 held in position by the flange 293 and the rivets or screws 294.

From the tray 292 the assembled and adhesively connected belt units will be dumped into the semi-cylindrical trough X which is hung upon the doors 296 and 297 of the supporting structure U by means of the hanging straps 298 and 299.

Referring to FIG. 10 the gear units 261 and 262 are driven by the spur gear 300 which in turn is driven by the worm 301. The worm 301 is driven by the belt drive 302 which has a belt 303 extending down to the pulley 304. The pulley 304 is driven from the motor 305 which is controlled from the limit switch 306 (see FIG. 1).

The auxiliary belt element 308 is carried backwardly over the carrier roller 307 and then passes upwardly to the roller 286 (see also FIG. 1).

Referring to FIGS. 5 and 9 the guide plate 210 is mounted at 320 upon the vertical plate 321. The thermoplastic backing will also be provided with the guide plate 322 which is mounted upon a vertical plate member 323. The vertical plate member 323 is pivotally mounted at 324 and is provided with the outstanding lip 325.

The lip 325 is parallel to the lip 326 which carries the screw 327. The plate 323 has a spring 328 which is connected to the vertical plate 329 and which tends to pull the upper portion of the plate 323 forwardly.

The screw 330 will adjust the spacing between the lips 325 and 326 so as to limit the movement of the plate 323.

Referring to the adjustment arrangement shown in FIGS. 3 and 4 there are provided the cross-bars 340 which carry the screws 341 and the lock nuts 342. These screws 341 abut on the elements 343 which extend inwardly from the slide bars 344 and 345. The screws may be adjusted in position so as to elevate or lower the cross-bar 340 in respect to the elements 343.

Another adjustment is provided at the lower T structure 346 which has the outstanding arms 347 which carry the adjustable screws 348. These are locked in position by the lock nuts 349. It will also be noted that the screws 109 fit in the transverse slot 350 (see FIG. 4) which permits lateral adjustment.

The pneumatic cylinder S as shown in FIG. 3 is provided with the supply lines 370 and 371 which may consist of hoses. These are controlled by means of the valve Y which in turn will be controlled by the foot treadle T.

The valve Y is supported upon the platform 372 which in turn is supported by an angle bracket 373 upon the wall 374. The valve Y will be operated by the lever 375 having the connection 376. This will cause a reciprocatory movement of the carriage R between each belt section to be assembled together. Each assembled folded belt section is subjected to the adhesive heat treatment as it passes between the upper and lower irons 252 and 253 and until it is discharged into the trough X.

In operation, the fabric facing and the backing will be placed in the guide member 107 in FIG. 3, with the backing passing into the reception box between the side plates 115 of the folder P and below the base plate 92 as best shown in FIG. 6.

The sides of the fabric will first be folded inwardly as indicated in FIG. 8 until it has the same width as the fabric backing A, and then the corners will be folded inwardly as the folder J first moves downwardly and the folder K then subsequently moves downwardly.

The corner folder J will be carried downwardly by the sliding member 38 which is actuated from the foot treadle T while the second corner folder K will be actuated by the lever 192 which is actuated in turn by the roller 66 as it moves through the cam slot 63 under forces of the pneumatic motor S which is also carrying forward the carriage R.

The guide plate 210 will assure that the plastic backing A and fabric facing D will become assembled together and fed between the upper and lower rollers 211 and 212 and between the belts 265 and 295.

The belts 250 and 251 will then carry the assembled unit forwardly between the pressing irons 252 and 253 when the adhesive function will be formed between the edges 10 and 11, and the exposed adhesive portion C as shown in FIG. 14.

The belt unit may then be finished by stitching if desired.

By suitable adjustments any thickness of the facing material D and adhesive backing A may be selected with assurance that there will be sufficient heat and sufficient pressure to form a desired junction.

The finished belt units will be discharged into the trough X of FIG. 1 and may from there be passed to the next operation.

In the preferred operation, a micro-switch is provided which is normally operated by the manual treadle which will start the electric motor which in turn will start the conveyor belts.

Whereas the first corner folder will be manually actuated, the second corner folder will be actuated by means of the movement of the carriage which is advanced by way of the pneumatic cylinder.

Extra heat is provided with thick materials to assure that a proper adhesive connection is formed.

An open slot 123 on top of the folder P will enable adjustment of the materials and checking of the assembly operation.

Referring to FIGS. 14 and 15 it will be noted that the adhesive C does not extend to the folded edges 18 but is limited to between the serrated edges 17 so that there will be no adhesive connection at the folded edges 18 which may be stitched together as desired without interfering with any intervening adhesive which will affect the shape and fluff of the belt. The adhesive is most effective in its attachment to the free inturned edges 450 of the longitudinally infolded portions of the fabric face and the adhesive connection desirably extends over these free edges 450 but terminates short of the outside edges 451 (see FIG. 15).

By eliminating the adhesion over the entire face a more effective permanent adhesive connection is produced with the serrated edges 17 of the adhesive material C assuring a firmer connection and being less liable to tear loose if the belt is used without edge stitching.

There should be a substantial overlap at the point 452 and this is better shown in FIGS. 11, 12 and 13. The backing and fabric are being continuously advanced together as the fold is being made so that as each corner is turned downwardly it will also be gradually turned inwardly.

For example, in FIG. 11 the corner G will be turned gradually inwardly and downwardly as the facing D and the backing A are being advanced together. At the same time, the edge 453 will be beyond the center line 454 of the advancing fabric D so as to achieve an overlap which is indicated by the spaced dot and dash lines at 452 in FIG. 13.

Each corner will be folded so that its corresponding edge 453 is positioned on opposite sides of the center line 454 of the longitudinally folded fabric face D.

By providing this overlap centrally of the point better adhesion is assured at the position 455 in FIG. 15 where the belt would tend to be subjected to the maximum stresses if it is used with adhesive connection and without edge stitching.

The present structure is particularly satisfactory in that short strips of both fabric and backing may be employed without a paper liner and the strip of backing and fabric may be cut to length as desired.

The pressing irons are continuous and do not change in direction and assure a proper adhesion whether the heat be applied on one side only—preferably the bottom—or on both sides. The entire mechanism as shown in FIG. 1 is controlled from the front and as the foot treadle T is actuated the carriage will move forwardly and the entire motion then automatically follows.

In FIG. 2 a resilient contact is utilized between the walls 102 so as to prevent the strip from backing up as the fabric is advanced and as the assembled belt enters the nip between the rollers 211 and 212 and the belts at 265 and 295 of FIG. 9.

It will be noted that the backing strip is elevated by the plate or cam element 210 so it moves upwardly and contacts the folded fabric and so that the fabric which has been folded and pointed and the backing are closely adjacent to one another as they enter the nip between the rollers 211 and 212.

Referring to FIG. 6, the pointed tip 136, 137 is pressed down at the right by the spring 114 so that the point will be brought more closely adjacent to the backing A as it is moved parallel to the fabric face D and this will prevent the backing strip from curling upwardly.

Referring to FIG. 9, the plate 210 may be made thoroughly movable by providing a slotted attachment at 320, or by providing a threaded bolt as this point.

To avoid blowing up of the cloth as it is being pointed at the right end of FIGS. 6 and 7, a spring finger may be provided projecting forwardly from under the upper plate 117 to hold the cloth in position as it is being pointed.

A particular feature of the present invention resides in the manner in which the point of the belt is formed without a raw edge. This is accomplished as shown in FIGS. 11, 12, 13 and 15 by folding the corner G inwardly beyond the center line and then folding the point H on the opposite side in sequence beyond the center line, so that there will be an overlap, as shown best in FIGS. 13 and 15, at the central portion of the belt, without there being any ruffling or excess material at the central axis of the belt, as would occur if both corners G and H were folded inwardly at the same time.

In other words, the fold blades J and K not only fold the corners in sequence but they also fold them so that they will extend beyond the longitudinal center line or axis of the belt.

Moreover, the adhesive material C will attach itself to the inturned edges of the fabric as well as the edges of the point fold, as shown in FIGS. 14 and 15, without attaching itself to the side or edge bends, so that the belt does not have a compressed appearance.

As an alternative, in view of the space indicated at 350 between the blades J and K in FIG. 11, both blades J and K can be moved down simultaneously, with the excess material being caught or retained in said recess 350a. This excess material will not accumulate at the center of the belt but due to the slot will take the form of an additional fold, which also will form at the center or longitudinal axis of the belt.

However, the preferred procedure contemplates that the excess material will be taken care of by the overlapping of the folds as shown in FIGS. 13 and 15 made by operating the folder blades J and K in sequence so that first one corner is folded beyond the axis of the fold and then the second corner is folded beyond the axis of the belt.

In respect to the nip rollers 211 and 212 of FIG. 9, these rollers may be separated as the assembled folded belt and backing is passed therein so that there is no "grabbing" action as the assembled fabric and backing is inserted with the rollers then closing after the insertion has taken place.

The pressure between the irons is controlled by the thickness of the cloth and the thickness of the backing and the backing may be paper or other laminated combinations than the preferred impregnated fabric, as previously stated.

While there has been herein illustrated and described the preferred embodiment of the invention it is to be understood that applicant does not limit himself to the precise construction herein disclosed, and the right is reserved to all changes and modifications coming within the scope of the invention as defined in the appended claim.

Having now particularly described and ascertained the nature of the invention, and in what manner the same is to be performed, what is claimed is:

In a laminated backed fabric faced belt making machine, fabric feed guide means including side and successive corner folders for a strip of the fabric to guide the fabric, a backing feed guide means for a strip of plastic backing, said last mentioned guide means being positioned below the fabric feed guide means to guide the backing below the fabric feed guide means and in parallelism with the fabric, means to assemble the fabric and backing together, upper and lower belts to receive and hold together the assembled fabric and plastic backing, upper and lower platens to press said belts together while carrying the assembled fabric and plastic backing, heater means associated with said platens to heat the plastic backing while carried by the belts to cause its adherence to the fabric, and means to discharge the final heat adhered fabric and plastic backing belt from between the belts, said folders including a first folder means for the fabric to fold the side edges of the fabric under and below the fabric, spaced apart second and third folder means, means operating said second and third folder means for folding the forward corners of the fabric under and below the folded side edges to point the forward end of the fabric.

References Cited in the file of this patent

UNITED STATES PATENTS

| | | |
|---|---|---|
| 1,320,413 | Reznicek | Nov. 4, 1919 |
| 1,561,229 | Haon | Nov. 10, 1925 |
| 2,266,953 | Blue | Dec. 23, 1941 |
| 2,368,445 | Brandt | Jan. 30, 1945 |
| 2,392,695 | Rohdin | Jan. 8, 1946 |
| 2,396,329 | Lippmann | Mar. 12, 1946 |
| 2,596,884 | Bailen | May 13, 1952 |
| 2,635,670 | Winberg | Apr. 21, 1953 |
| 2,685,908 | Loew | Aug. 10, 1954 |
| 2,692,221 | Bihler | Oct. 19, 1954 |
| 2,702,067 | Goldberg | Feb. 15, 1955 |
| 2,853,411 | Riley | Sept. 23, 1958 |